United States Patent [19]

Maguire

[11] Patent Number: 4,557,912

[45] Date of Patent: Dec. 10, 1985

[54] AIR POLLUTION REDUCTION

[76] Inventor: Milton J. Maguire, 3745 W. El Caminito Dr., Phoenix, Ariz. 85021

[21] Appl. No.: 673,193

[22] Filed: Nov. 14, 1984

[51] Int. Cl.$^4$ .................... C01B 17/00; C01B 17/82; B01D 19/00

[52] U.S. Cl. .................................... 423/242; 423/523; 55/73

[58] Field of Search ............... 423/242 R, 242 A, 523; 55/73

[56] References Cited

U.S. PATENT DOCUMENTS

| | | | |
|---|---|---|---|
| Re. 16,709 | 8/1927 | Fairlie ................................... | 423/523 |
| 1,022,012 | 4/1912 | Whitney ............................... | 423/523 |
| 1,390,410 | 9/1921 | Webster ................................ | 55/73 |
| 1,513,903 | 11/1924 | Hechenbleikner et al. ......... | 423/523 |
| 3,473,297 | 10/1969 | Tamura et al. ........................ | 55/73 |
| 3,577,706 | 5/1971 | Moller ................................... | 55/30 |
| 3,765,153 | 10/1973 | Grey ..................................... | 423/242 |
| 3,767,777 | 10/1973 | Frye et al. ............................ | 423/575 |
| 3,770,385 | 11/1973 | Grey et al. ........................... | 423/242 |
| 4,014,981 | 3/1977 | Wainer ................................. | 55/73 X |
| 4,120,669 | 10/1978 | Amendola ............................. | 57/73 |
| 4,302,218 | 11/1981 | Friedman ........................... | 48/197 R |
| 4,322,224 | 3/1982 | Roth ..................................... | 55/30 |

OTHER PUBLICATIONS

J. E. Ferguson, "Inorganic Chemistry and the Earth", Pergamon Press, 1982, pp. 167–169.

Mellor's "Modern Inorganic Chemistry", 1967, pp. 496–503.

*Primary Examiner*—Gregory A. Heller
*Attorney, Agent, or Firm*—Robert C. Baker

[57] ABSTRACT

The method of reducing air pollution comprises treating air-polluting waste industrial flue gases containing sulfur dioxide in a manner effective to substantially reduce the content of sulfur dioxide therein and remove it in the form of a sulfuric acid by-product prior to discharge of the treated flue gases into the atmosphere. The treatment involves the use of towers and nitrogen oxides for effecting the oxidation of sulfur dioxide to the trioxide. Preferably, the waste industrial flue gas is separated into a low molecular weight fraction and a higher molecular weight portion, as by centrifugal action to concentrate the heavier sulfur dioxide molecules, before treating only the higher weight portion.

7 Claims, 3 Drawing Figures

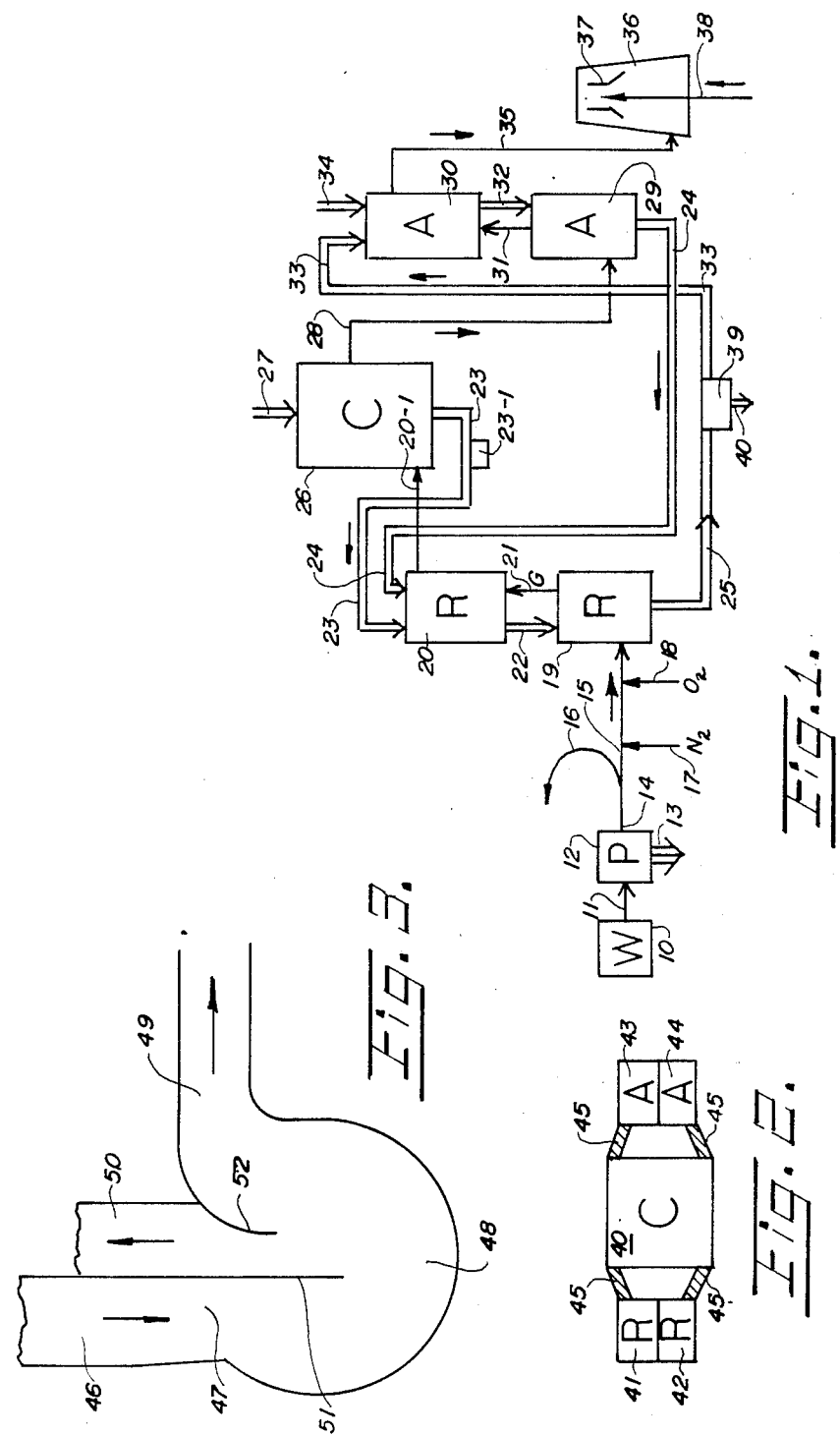

AIR POLLUTION REDUCTION

BACKGROUND OF THE INVENTION

This invention relates to a method of reducing air pollution, and more particularly relates to the reduction of air pollution by treating air polluting waste industrial flue gases of the type containing sulfur dioxide prior to discharge of the flue gases into the atmosphere. The treatment is accomplished in a manner effective to substantially reduce or eliminate the content of sulfur dioxide in the flue gases and remove it in the form of a sulfuric acid by-product.

Waste industrial flue gases arise in a number of industrial operations, amongst which is that of burning fossil fuels and particularly coal in plants for the generation of electricity. Smelting operations, including the smelting of copper and a variety of other ores, also cause the creation of a variety of air-polluting waste industrial flue gases.

Common to all of these waste flue gases is the varying content of sulfur dioxide therein, sometimes only at relatively low levels such as only about 2 or 3 or 4% by weight but sometimes as high as 10% or even possibly 20% or more by weight, but usually at a relatively low level as compared to the great volume or quantity of the industrial flue gas. However, even at lower weight percentages, the total quantity of the sulfur dioxide generated in the conduct of these industrial operations can significantly alter the atmosphere so as to contribute to acid rain problems and substantial damage to the habitat or environment for various forms of life on Earth.

Pitted against the damage to the environment is the cost for reducing the sulfur dioxide content of these waste industrial flue gases when the volume of the gas is so great as compared to the sulfur dioxide in the gases.

The present invention is directed to a solution to this problem and a solution which can effectively substantially eliminate the sulfur dioxide in waste industrial flue gases in an economically feasible manner that provides a by-product which offsets some of the cost of doing so.

SUMMARY OF THE INVENTION

The method provided by the invention comprises, broadly, a series of steps for treating the waste industrial flue gases so as to greatly reduce or substantially eliminate the content of sulfur dioxide therein and remove it in the form of a sulfuric acid by-product.

A preferred preliminary step for the treatment of the waste flue gases is that of removing solid particulate matter therefrom; and this is followed by conduiting at least a higher molecular weight portion of the flue gases to a reactor tower means. The higher molecular weight portion is that portion having a greater concentration of sulfur dioxide therein than in the waste industrial flue gas generated in the industrial operation. Thus, in the most preferred practice of the invention, the waste industrial flue gas, after removal of particulate matter therefrom, is separated into a low molecular weight fraction and a higher molecular weight portion; and in the preferred practice of the invention, it is only the higher molecular weight portion that is conduited to reactor tower means.

At least the higher molecular weight portion of the flue gas is moved through the reactor tower means while intimately intermingling that portion with a sufficient quantity of air oxygen and a sufficient quantity of a variety of nitrogen oxides for effecting oxidation of the sulfur dioxide content of that portion to the trioxide. Simultaneously, within the reactor tower means, that higher molecular weight portion is intermingled with a sufficient quantity of $H_2O$, that is water, for sulfuric acid to be formed as the product of substantially all sulfur dioxide undergoing oxidation to sulfur trioxide within the reactor tower means. A substantial quantity, at least approximately 50% by weight, of the sulfur dioxide passing through the reactor tower means is oxidized to the trioxide and formed into sulfuric acid within the reactor tower means.

The gaseous mixture resulting from the treatment in the reactor tower is then passed to a chamber means. This gaseous mixture includes air oxygen and the nitrogen oxides as well as the constituents of the flue gases (generally including some sulfur dioxide) remaining after movement through the reactor tower means.

As the gaseous mixture is moved through the chamber means, further oxidation of the sulfur dioxide takes place while the gases are simultaneously subjected to a water ($H_2O$) spray. This operation effectively forms further or additional sulfuric acid and substantially eliminates sulfur dioxide from the gaseous mixture. From the chamber means, the residual gaseous mixture left after the $H_2O$ spray operation is passed to absorption tower means.

Within the absorption tower the nitrogen oxides of the residual gaseous mixture are substantially removed as that residual gaseous mixture passes through the absorption tower.

The final gaseous mixture remaining as gaseous after the treatment in the absorption tower is passed into an exhaust stack for discharge into the atmosphere.

Simultaneously while the foregoing steps are conducted continuously, sulfuric acid is constantly withdrawn from the reactor tower means, the nitrogen oxides removed in the absorption tower treatment are re-cycled into the reactor tower means where they again perform their oxidation function, and sulfuric acid formed in the chamber means is withdrawn and preferably at least a portion re-introduced into the reactor tower means. The chamber sulfuric acid is relatively diluted in that it contains an excess of $H_2O$ which becomes available for the formation of further sulfuric acid and an increased concentration of sulfuric acid in the reactor tower means.

Exhaustion or discharge of the final gaseous mixture from the exhaust stack is preferably but not necessarily accomplished in a manner enhancing the velocity of flow for that final gaseous mixture out of the exhaust stack. Most preferably, the velocity of flow from the exhaust stack is sufficient to create a slight vacuum or suction or reduced pressure for drawing the gaseous components through the entire system or apparatus. One suitable way to enhance the velocity of flow from the exhaust stack is that of employing the low molecular weight fraction earlier separated from the waste industrial gases as a high velocity fraction passing through a Venturi in the exhaust stack. Other means such as fans or constricted areas may alternately be employed to enhance the velocity of escape of the final gaseous mixture from the exhaust stack.

Still other features and advantages of the invention will become evident as this description proceeds.

BRIEF DESCRIPTION OF DRAWING

FIG. 1 is a schematic diagram in the nature of a flow sheet illustrating the various processing of the invention;

FIG. 2 is a schematic plan top view of a compact or space-saving arrangement for the towers and chamber employed in the process; and FIG. 3 is a schematic illustration of one arrangement for the conduiting to accomplish the separation of waste industrial flue gas into a low molecular weight fraction and a higher molecular weight portion.

DESCRIPTION OF PREFERRED EMBODIMENTS

Referring particularly to FIG. 1, waste industrial flue gas W generated in an industrial plant 10 is passed through any suitable conduit to a means 12 for removing solid particulate matter therefrom. Illustratively, the means 12 may consist of an electronic precipitator P. The purpose here is to remove solid ash particles; and those may include portions or quantities of silica or other solid material. The solid material 13 is, of course, withdrawn from the stream of gaseous material.

From the precipitating means 12, the gaseous material is passed through a conduit 14. At least the higher molecular weight portion of it is carried through conduiting means 15 to an R reactor tower 19. The higher molecular weight portion of the waste flue gases is that portion which contains substantially all of the sulfur dioxide in the flue gases. After removal of solid particulates, flue gases are mostly composed of oxides of carbon such as carbon monoxide and carbon dioxide, some water or $H_2O$ air components, and possibly very minor amounts of other gaseous material. It is the oxides of sulfur which are the greatest contributors to air pollution; and it should be recognized that the molecular weight of sulfur dioxide is well in excess of the molecular weight of other molecular constituents of the flue gas. (Also, recognize that the specific gravity and density of sulfur dioxide is greater than the other components.) This difference in molecular weight may be taken advantage of; and the flue gas may be separated into a low molecular weight portion or fraction in duct 16 and a high molecular weight portion in duct 15, the latter including substantially all of the sulfur dioxide of the flue gas. At least the higher molecular weight portion is conduited to the reactor tower 19. (If desired, the portion conduited to the reactor tower 19 may be assisted in its movement, or its movement accelerated, by the use of fan means. Indeed, movement through all conduits for the process may be so assisted; but preferably a draught or suction effect at the exhaust stack is employed to facilitate the desired movement.)

Simultaneously, either through side conduit 17 into the conduit 15 to the tower 19, or directly into tower 19 near the lower end thereof, nitre or any other source for nitrogen oxides (or the nitrogen oxides themselves, such as $NO_2$, $N_2O_5$, and others) is introduced into the reactor tower 19 to the extent that replenishment of any loss of the recycled nitrogen oxides is needed in the overall conduct of the process. Further, a conduit 18 is employed for introducing additional air either in the conduit 15 to the reactor tower 19 or directly into the reactor tower 19. Oxygen is necessary for the process, and is believed to effect the rejuvenation of "spent" nitrogen oxides (i.e., spent in effecting the oxidation of sulfur dioxide to the trioxide) to a state of oxidation where they again function to give up oxygen for the oxidation of sulfur dioxide as the process continues.

Most preferably, the reactor tower means consists of at least two reactor towers 19 and 20. Suitable reactor tower means may consist of the well-known Glover towers. Such towers are lined with material highly resistant to acid attack and are packed with flints or the like. The packing provides not only a greatly increased surface area but also a multitude of channels. Gaseous materials introduced into the first tower 19 rise upwardly through the tower and then are passed through a conduit 21 into the lower portion of the second tower 20 and likewise rise upwardly through that tower. In counter-current flow, relatively weak sulfuric acid from conduit 23 at the top of tower 20 falls downwardly. Additionally, as will further be explained below, the captured nitrogen oxides in fluid from the absorption tower means 29 are passed through a conduit 24 into the top of the reactor tower 20. The fluid containing the captured nitrogen oxides is commonly referred to as strong nitrated acid and constitutes a source for the generation of the nitrogen oxides within reactors 20 and 19. To be observed is that the liquids falling to the base of reactor tower 20 are suitably passed through to the top of reactor tower 19 and continue their fall. The liquids become relatively strong in concentration of sulfuric acid (e.g., a sulfuric acid concentration of over 90%) at the bottom of the reactor tower 19 and are withdrawn through an appropriate conduit 25. (Optionally, the circuiting of materials through Glover towers might be in parallel as distinguished from the series arrangement illustrated.)

The flue gases moving through the reactor tower means are continually and intimately intermingled with a sufficient quantity of air oxygen as well as a sufficient quantity of a variety of nitrogen oxides for effecting oxidation of the sulfur dioxide content of the gases into the trioxide. Further, the weak acid or weak sulfuric acid solution entering the top of the reactor tower 20 through conduit 23 furnishes a sufficient quantity of $H_2O$ for sulfuric acid to be formed as the product of substantially all sulfur dioxide that is in fact oxidized to the trioxide within the reactor tower means. By employing plural reactor towers, at least approximately 50% by weight of the sulfur dioxide passing through the reactor tower means is oxidized and formed into sulfuric acid within the reactor tower means. This is exceedingly important, for it permits a relative reduction of the space or the size required for a chamber structure C (such as chamber 26), which in turn can reduce maintenance costs. A relative reduction in the size of the absorption towers or Gay Lussac towers is also permitted.

The gaseous mixture of air oxygen and nitrogen oxides and the flue gases remaining after movement through the reactor tower is passed through a conduit 20-1 into chamber 26, at a lower portion of that chamber. Water in the form of a spray of small particles is introduced in chamber 26 at the top thereof through a conduit 27. While the water may be in the form of steam (or at an elevated temperature), it is suitable and desirable to employ lower temperature introduction for the water. Within the chamber 26 the reaction of oxidation of the sulfur dioxide to the the trioxide and the formation of sulfuric acid continues. Of course, the reactions within the chamber are exothermic and tend to maintain the walls of the chamber at least warm to the touch. The excess of water within the chamber tends to effect dilution or, in essence, cause the formation of a relatively weak sulfuric acid (e.g., concentrations around 50%). That acid is withdrawn through conduit 23 and at least some of it is passed back to the top of reactor tower 20. Some of the weak chamber sulfuric acid may be completely withdrawn from the system by any suitable means such as that illustrated at 23-1.

Conventionally, lead is required for the chamber structures 26 and the maintenance of such structures can be somewhat expensive. To be recognized, however, is that modified chamber means structured from stainless steel can be useful, for the temperatures attained in the chamber means may be kept low (below 50° C.) by the water spray despite the exothermic formation of sulfuric acid in the chamber. Also, the % concentration of sulfuric acid likewise may be kept low. Only one chamber is suitably employed in combination with at least two and even more reactor towers.

From the chamber 26, the mixture of residual gases remaining after the chamber reactions is passed through a conduit 28 into the lower portion of a first absorption tower means 29. Two absorption towers 29 and 30 (also labeled A) are illustrated. It is within these towers that the nitrogen oxides of the gaseous mixture escaping the chamber are recaptured.

Illustratively, the principles of the well-known Gay-Lussac tower may be employed for the absorption towers. Such towers may be filled with coke or similar inert packing causing high surface area and a maze of channels. The purpose of the absorption towers is to remove the nitrogen oxides from the other components of the residual gaseous mixture leaving the chamber 26. Thus, from the first absorption tower 29 the gases pass through a conduit 31 into the second absorption tower 30. In counter-current flow, the liquid for capturing the nitrogen oxides drops down and moves through the absorption towers 30 and 29. Suitably, a portion of the concentrated sulfuric acid withdrawn from the reactor tower 19 is moved through conduit 25 to a tank 39 for storage (with some removed from the system out a conduit 40); and from that tank a portion is pumped through conduit 33 to the top of the absorption tower 30. Where concentrated sulfuric acid is employed as the liquid for capturing nitrogen oxides within the absorption towers, a highly nitrated sulfuric acid is the result; and this nitrated sulfuric acid is then re-cycled through conduit 24 to the top of the reactor tower 20. On the other hand, other liquids may be introduced into the top of the absorption tower assembly through a conduit 34, water being but illustrative, for the purpose of entrapping or capturing the nitrous oxides of the gaseous mixture passing through the absorption towers and forming a highly nitrated or nitric acid fluid. Whatever method is employed, the fluid captured nitrogen oxides are re-cycled through conduit 24 to the top of the reactor tower 20 where they again perform their oxidizing function in generating or forming sulfur trioxide as a step in the formation of sulfuric acid.

The final gaseous mixture exiting the upper end of the absorption tower 30 is substantially or entirely free of sulfur dioxide and of nitrogen oxides. It passes through a conduit 35 into an exhaust stack 36. This final gaseous mixture is at a relatively or somewhat elevated temperature and does tend to rise and discharge itself from the exhaust stack 36; and it is to be emphasized that discharge from the stack 36 need not be specially accelerated. On the other hand, to facilitate or improve the movement (as by a drawing or suction action) of the gaseous mixtures through the several towers and chamber of the apparatus, aids may be employed to enhance the rate of discharge from the stack 36. A Venturi arrangement 37 may be interposed within the exhaust stack in spaced relationship to the walls thereof. Air optionally may be introduced through a conduit 38 to the Venturi 37 to aid the accelerating function; and the air may be compressed or forced through the Venturi. Where the low molecular weight fraction (i.e., that fraction or part substantially free of sulfur dioxide) of the waste industrial gases is removed prior to passing the high molecular weight portion through the towers and chamber of the apparatus, it is practical to pass that low molecular weight fraction through line or conduit 38 to feed the Venturi 37 and accelerate the movement of the high molecular weight portion through the towers and chamber of the apparatus. Still other structural arrangements may be employed to gain a near equivalent to the Venturi effect, as for example, a constriction in an exhaust stack.

Referring to FIG. 2, the chamber 40, also labeled C, for the process may be placed between side-by-side reactor towers 41 and 42 on one side and side-by-side absorption towers 43 and 44 on the other. In fact, the chamber 40 may be hung on a frame supported by the towers on each side and with edge supports 45 cantilevered from the towers. The side-by-side towers suitably are placed in a common frame with a dividing wall therebetween; and the chamber walls could be exposed to the air except possibly for a protective wall to save them from accidental damage at the ends or sides where no towers are located. Such an arrangement saves space and should lower construction costs.

In FIG. 3, a U turn separator of waste gas into a high molecular weight portion and a low molecular weight portion is illustrated. The incoming duct 46 carries the large volume of raw waste gases. It may be slightly constricted or changed in shape at the duct portion 47 before entering the U turn area 48, which is bulbulous in character. The heavier molecules of higher molecular weight (i.e., the sulfur dioxide molecules) tend to be thrown toward or against the outer curved surface of the bulbular U turn portion 48 and are swept by the velocity of the gas movement in a centrifugal manner out duct 49 for processing in the manner aforedescribed. The lighter weight components of gas pass between the scoop wall 52 and the mid-feather or center wall 51 into passage 50 where they are conduited to a smoke stack or exhaust stack. The fundamental principle here is that of relying upon duct design and centrifugal forces to effect a throwing of the higher weight molecules toward the walls of the bulbulous portion 48. That higher weight portion is then scooped by wall 52 to pass into the conduit 49 for further processing. The lower weight portion which is essentially free of all sulfur dioxide is allowed to escape the bulbulous portion 48 through the passage between the midwall 51 and the separator or scoop wall 52 for collecting the higher weight portion. Various configurations for the ducting to accomplish this separation are possible, with the fundamental principle being that of causing the higher weight molecules to brush against or move toward the peripheral portions of the sharp shift of direction for the gases by centrifugal action. If desired, movement of the gases through the separator may be accelerated by placing fans in one or more of the ducts 46, 49, and 50; but generally the acceleration of exhaust will be most preferred.

Thus, the volume of waste gas which needs to undergo treatment to reduce sulfur dioxide can be relatively reduced and thereby more economically handled through towers and chambers of the apparatus. Indeed, the higher molecular weight portion may consist of as little as 40% or 50% up to about 75% of the total volume of the waste gas. In any event, at least 25% up to at least about half or more of the waste gas can be separated as the lower molecular weight fraction not subjected to special treatment or passed through the towers for the purpose of sulfuric acid formation.

There is thus described a new process for the relatively economical removal of sulfur dioxide from high volumes of waste industrial flue gases, with major formation of the sulfur dioxide into sulfuric acid within reactor tower means, and with a preferred separation of waste gases into a low molecular weight fraction and a high molecular weight fraction so as to reduce the quantity of gaseous material subjected to the resistance of tower packing. A side benefit of the process is that of the possible oxidation of carbon monoxide into carbon dioxide or even the possible oxidation of vaporized hydrocarbons should any be present in the waste gases.

The invention may be embodied in other specific forms without departing from the spirit or essential charactistics thereof. The present embodiments are therefore to be considered in all respects as illustrative and not restrictive, the scope of the invention being indicated by the appended claims rather than by the foregoing description; and all changes which come within the meaning and range of equivalency of the claims as construed for validity are therefore intended to be embraced thereby.

That which is claimed:

1. The method of reducing air pollution by treating air-polluting waste industrial flue gases containing sulfur dioxide in a manner effective to substantially reduce the content of sulfur dioxide therein and remove it in the form of a sulfuric acid by-product prior to discharge of the treated flue gases into the atmosphere, comprising conduiting the waste industrial flue gases through means for removing solid particulate matter therefrom, separating said waste industrial flue gases into a low molecular weight fraction and a higher molecular weight portion, said separating step including conduiting the flue gases through a duct which turns sharply in direction to thereby effect a centrifugal throwing of the highest molecular weight molecules of the flue gas toward the outer side of the duct where they are swept out a separate duct for conduiting the same as said higher molecular weight portion to reactor tower means conduiting at least said higher molecular weight portion of said flue gases to said reactor tower means, said higher molecular weight portion being that portion having a greater concentration of sulfur dioxide than in said waste industrial flue gas, moving said portion upwardly through said reactor tower means while intimately intermingling said portion with a sufficient quantity of air oxygen and a sufficient quantity of a variety of nitrogen oxides for effecting oxidation of the sulfur dioxide content of said portion, and while simultaneously intimately intermingling with said portion a downward flow of a sufficient quantity of $H_2O$ for sulfuric acid to be formed as the product of substantially all sulfur dioxide that is oxidized in said reactor tower means, at least approximately 50% by weight of the sulfur dioxide passing through said reactor tower means being oxidized and formed into sulfuric acid within said reactor tower means, passing to chamber means the gaseous mixture of air oxygen and nitrogen oxides and the flue gases remaining after movement of said portion through said reactor tower means, moving said remaining gaseous mixture upwardly through said chamber means while simultaneously spraying $H_2O$ downwardly through said remaining gaseous mixture, to thereby effect further conversion of oxidized sulfur dioxide into sulfuric acid, passing to absorption tower means the residual gaseous mixture from said chamber means, substantially removing the nitrogen oxides from said residual gaseous mixture as it passes through said absorption tower means, passing the final gaseous mixture resulting from the treatment in the absorption tower means into an exhaust stack, discharging said final gaseous mixture into the atmosphere, and simultaneously as the foregoing steps are conducted continuously, withdrawing sulfuric acid from said reactor tower means, and recycling the removed nitrogen oxides from the absorption tower means back into said reactor tower means.

2. The method of claim 1 wherein the movement of said portion through the reactor tower means comprises a movement thereof through one reactor tower followed by the movement thereof through a second reactor tower.

3. The method of claim 1 comprising introducing into said reactor tower means additional air oxygen beyond any present in said portion of said waste industrial flue gases.

4. The method of claim 1 additionally comprising the step of accelerating the discharge from the exhaust stack.

5. The method of claim 1 additionally comprising the step of accelerating the discharge from the exhaust stack by Venturi means through which is passed gaseous material other than that from said absorption tower means.

6. The method of claim 1 additionally comprising the step of accelerating the discharge from the exhaust stack by Venturi means through which is passed gaseous material comprising a lower molecular weight fraction of said waste industrial flue gases.

7. The method of claim 1 wherein said separating step additionally includes acceleration of the movement of said waste industrial flue gases through said duct having a sharp turn of direction.

* * * * *